US007714097B2

(12) United States Patent
Zhang et al.

(10) Patent No.: US 7,714,097 B2
(45) Date of Patent: May 11, 2010

(54) POLYMER SYNTHESIS FROM MACROCYCLES

(75) Inventors: Donghui Zhang, Las Cruces, NM (US); William B. Tolman, Minneapolis, MN (US); Marc A. Hillmyer, Minneapolis, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 870 days.

(21) Appl. No.: 11/545,092

(22) Filed: Oct. 6, 2006

(65) Prior Publication Data

US 2007/0083019 A1 Apr. 12, 2007

Related U.S. Application Data

(60) Provisional application No. 60/724,927, filed on Oct. 7, 2005.

(51) Int. Cl.
*C08G 63/78* (2006.01)
*C08G 63/82* (2006.01)
*C08G 63/91* (2006.01)
(52) U.S. Cl. .................. 528/355; 528/357; 525/450
(58) Field of Classification Search ................ 528/355, 528/357; 525/450
See application file for complete search history.

(56) References Cited

U.S. PATENT DOCUMENTS

| | | | |
|---|---|---|---|
| 2,356,459 | A | 8/1944 | Kung |
| 3,111,469 | A | 11/1963 | Maraus |
| 5,212,284 | A | 5/1993 | Krabbenhoft et al. |
| 5,247,059 | A | 9/1993 | Gruber et al. |
| 5,288,841 | A * | 2/1994 | Bellis et al. .................. 528/275 |
| 6,444,596 | B1 | 9/2002 | Hirai et al. |
| 2006/0004183 | A1* | 1/2006 | Sato et al. .................... 528/354 |

FOREIGN PATENT DOCUMENTS

| | | |
|---|---|---|
| EP | 577206 A2 | 1/1994 |
| GB | 2277324 | 10/1994 |
| JP | 6329774 | 11/1994 |
| JP | 9169753 | 6/1997 |
| JP | 38026596 | 9/2006 |
| RO | 102187 | 9/1991 |

OTHER PUBLICATIONS

Brunelle, D. J., et al., "Preparation and Polymerization of Bisphenol A Cyclic Oligomeric", *Macromolecules*, 24(11), (1991),3035-3044.
Cao, A. , "Phase Structure and Biodegradation of the Bacterial Poly(3-hydroxybutyric acid)/Chemosynthetic Poly(3-hydroxypropionic acid) Blend", *Polymer Journal*, 30(9), (1998),743-753.
Drumright, R. E., "Polylactic Acid Technology", *Advanced Materials*, 12(23), (2000),1841-1846.
Gresham, T. L., et al., "Beta-Propiolactone. I. Polymerization Reactions", *J. Am. Chem. Soc.*, 70, (1948),998-999.
He, Y. , et al., "Biodegradable Blends of High Molecular Weight Poly(ethylene oxide) with poly(3-hydroxypropionic acid) and poly(3-hydroxybutyric acid): a Miscibility Study by DSC, DMTA and NMR Spectroscopy", *Polymer International*, 49, (2000),609-617.
Hodge, P. , "Some Applications of Reactions Which Interconvert Monomers, Polymers and/or Macrocycles", *Reactive & Functional Polymers*, 48, (2001),15-23.
Jedlinski, Z. , et al., "Novel Anionic Polymerization of Beta-Lactones Mediated by Alkali Metal Supramolecular Complexes", *Polymer International*, 37(3), (1995),187-190.
Kasuya, K. , et al., "Adsorption Kinetics of Bacterial PHB Depolymerase on the Surface of Polyhydroxyalkanoate Films", *International Journal of Biological Macromolecules*, 19, (1996),35-40.
Mathisen, T. , et al., "Hydrolytic Degradation of Melt-Extruded Fibers from Poly(Beta-Propiolactone)", *Journal of Applied Polymer Science*, 39, (1990),591-601.
Mathisen, T. , et al., "Hydrolytic Degradation of Nonoriented Poly(Beta-Propiolactone)", *Journal of Applied Polymer Science*, 42, (1991),2365-2370.
McCoy, M., "Starting a Revolution—Cargill Sees Corn and Soybeans as Chemical Feedstocks of the Future", *C&EN*, (Dec. 15, 2003),17-18.
Mecking, S. , "Nature or Petrochemistry?—Biologically Degradable Materials", *Angew. Chem. Int. Ed.*, 43, (2004),1078-1085.
Miyazawa, T. , "Oxidation of Diols With Oxoaminium Salts", *J. Org. Chem.*, 50, (1985),3930-3931.
Noltes, J. G., et al., "Investigations on Organozinc Compounds XIV. Organozinc-Catalyzed Polymerization of Lactones. The Interaction Between Ethylzinc Methoxide and (Ethyl-Zinc) Diphenylamine and Beta-Propiolactone", *Journal of Organometallac Chemistry*, 24, (1970),257-262.
Ouhadi, T. , et al., "Soluble Bimetallic Oxoalkoxide Catalysts. IV. Ring-Opening Polymerization of Beta-Propiolactone", *J. Macromol. Sci.—Chem.*, A9(7), (1975),1183-1193.
Ritter, S. K., "Biomass or Bust—Technology to Use Plant-Derived Sugars to Produce Chemical Feedstocks is Ready . . . and Waiting", *C&EN*, (May 31, 2004),31-34.
Roelens, S. , "2,2-Di-n-butyl-1,3,2-Dioxastannolane/Di-n-butyltin Dichloride: an Excellent Catalytic System for Cyclo-Oligomerization of Lactones", *J. Chem. Soc., Chem. Commun.*, (1990),58-60.
Schreck, K. M., et al., "Controlled Polymerization of Alpha-Methyl-Beta-Pentyl-Beta-Propiolactone by a Discrete Xinc Alkoxide Complex", *Tetrahedron*, 60, (2004),7177-7185.
Shanzer, A. , et al., "A Novel Series of Macrocyclic Lactones", *J. Am. Chem. Soc.*, 103, (1981),7339-7340.
Williams, C. K., et al., "A Highly Active Zinc Catalyst for the Controlled Polymerization of Lactide", *J. Am. Chem. Soc.*, 125(37), (2003),11350-11359.
Yamashita, M , "Organolanthanide-Initiated Living Polymerizations of -Caprolactone, -Valerolactone, and -Propiolactone", *Macromolecules*, 29(5), (1996),1798-1806.
Zhang, D. , et al., "Isotactic Polymers With Alternating Lactic Acid and Oxetane Subunits From the Endoentropic Polymerization of a 14-Membered Ring", *Macromolecules*, 37, (2004),5274-5281.

* cited by examiner

*Primary Examiner*—Fred M Teskin
(74) *Attorney, Agent, or Firm*—Schwegman, Lundberg & Woessner, P.A.

(57) ABSTRACT

A synthetic route is provided to prepare poly(ω-hydroxycarboxylic acid) polymers via the ring-opening polymerization of ω-hydroxycarboxylic acid cyclic oligomers. The cyclic oligomers can be prepared directly from biorenewable sources, such as 3-hydroxypropionic acid. The method can be used to prepare high molecular weight polymers from the cyclic oligomers. Good molecular weight control can be obtained for both solution state and melt polymerizations.

47 Claims, No Drawings

POLYMER SYNTHESIS FROM MACROCYCLES

RELATED APPLICATIONS

This application claims priority under 35 U.S.C. §119(e) to U.S. Provisional Patent Application No. 60/724,927, filed Oct. 7, 2005, which is incorporated herein by reference.

GOVERNMENT FUNDING

This invention was made with Government support under NSF Contract No. CHE-0236662. The United States Government has certain rights in this invention.

BACKGROUND OF THE INVENTION

The necessity of environmentally friendly replacements for commodity plastics has stimulated the development of polymers from bio-renewable sources. A notable example is polylactide, a commercially important material derived from lactic acid. Recent efforts in the chemical industry have been focused on new bio-derived starting materials that can be used for the preparation of new plastics, as well as other useful products and precursors. One example of an important bio-derived starting material is 3-hydroxypropionic acid (3-HP), a structural isomer of lactic acid, which comprises the repeat unit of a useful polymer, poly(3-hydroxypropionic acid) (P[3-HP]). High molecular weight P[3-HP] has attractive mechanical properties, such as rigidity, ductility, and exceptional tensile strength in drawn films. In addition, P[3-HP] is enzymatically and hydrolytically degradable, thus enhancing its environmental appeal.

P[3-HP] has been prepared by the condensation of 3-HP esters and the ring-opening polymerization (ROP) of β-propiolactone, but both methods suffer from disadvantages. Relative to condensations, ROP generally provides a greater degree of control over molecular weight, co-monomer incorporation, and end group definition. Yet while highly strained β-propiolactone can readily be ring opened to yield high molecular weight P[3-HP], it is carcinogenic and its large-scale synthesis is difficult, especially when starting with the preferred precursor 3-HP. Thus, it would be desirable to develop an alternative ROP route to P[3-HP] that avoids the use of β-propiolactone. Additionally, it would be desirable to develop new methodology for the preparation of high molecular weight P[3-HP] that is derived directly from biorenewable sources such as 3-HP.

SUMMARY OF THE INVENTION

The present invention provides a method to prepare a polymer by ring opening polymerization of macrocyclic esters. Marcrocycles of various ring sizes can be polymerized. These cyclic oligomers can contain multiple ester units. The cyclic oligomers can be prepared from simple starting materials such as, for example, ω-hydroxycarboxylic acids.

The method can be used to prepare high molecular weight polymers, including biorenewable and biodegradable plastics. The method can be performed on a large scale, for example, on a kilogram scale. The polymer can be prepared in the presence of solvent or under melt conditions. The polymerization can proceed rapidly at room temperature.

Accordingly, the invention provides a method to prepare a polymer by carrying out ring-opening polymerization on one or more compounds of formula II:

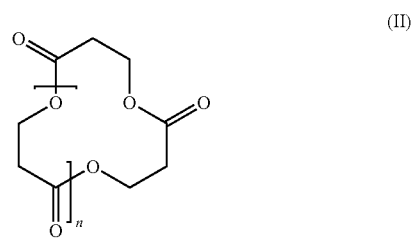

wherein n is 0 to about 30, preferably about 1 to about 10, in the presence of an effective catalyst, to provide one or more polymers of formula I:

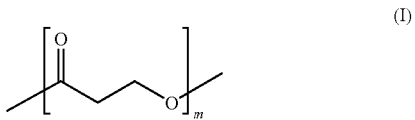

wherein m is about 10 to about 2500, preferably about 20 to about 1000.

The monomeric units of the polymer can be derived from 3-hydroxypropionic acid. One terminal group of the polymer of formula I can be a $(C_1-C_6)$alkoxy group, e.g., an ethoxy group, for example, as part of an ethyl ester moiety. The other terminal group of the polymer of formulas I can be a hydroxyl group. Alternatively, the other terminal group can be an acryloyl group. The compound of formula II can be prepared by condensing 3-hydroxypropionic acid in the presence of an acid catalyst to provide one or more compounds of formula II.

Thus, in one embodiment, the invention provides a method to prepare poly(3-hydroxypropionic acid) (P[3-HP]) from a cyclic polyester. P[3-HP] is a biodegradable polyester with good mechanical properties. The monomer, 3-hydroxypropionic acid (3-HP), is a biorenewable resource material and is less toxic that current monomers used in preparing P[3-HP]. The methods provided herein are easier to control than the condensation polymerization of 3-HP.

A catalyst is used to promote the polymerization of cyclic polyester oligomers, e.g., the compounds of formulas II and VII (described below). The catalyst can be an effective organic catalyst, inorganic catalyst, or an organometallic catalyst, for example, an organometallic complex. The catalyst can be a transition metal catalyst. The transition metal can be coordinated to organic groups, such as, for example, alkoxy groups, aryloxy groups, alkylamine groups, aralkylamine groups, optionally substituted derivatives thereof, or combinations thereof.

Accordingly, the invention provides a method to prepare a polymer by carrying out ring-opening polymerization of cyclic oligomers, e.g., of formula II or VII, with an effective amount of a catalyst of formula V:

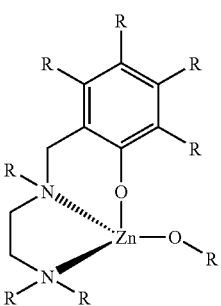

wherein each R is independently hydrogen or alkyl, for example, $(C_1-C_6)$alkyl. One skilled in the art will recognize that other structural variations of the catalyst of formula V can also be effective in the ring-opening polymerization reactions of the invention.

The invention also provides a method to prepare a polymer by carrying out ring-opening polymerization of cyclic oligomers with an effective amount of a catalyst of formula VI:

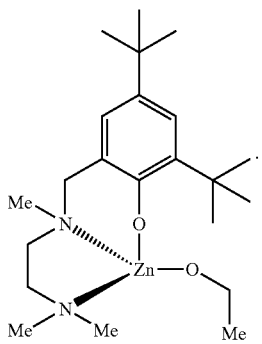

(VI)

The methods can be used to prepare polymers by carrying out ring-opening polymerization of cyclic oligomers derived from a variety of ω-hydroxycarboxylic acids. For example, the polymerization can also be carried out on macrocycles derived from the condensation of 2-hydroxyacetic acid, 4-hydroxybutanoic acid, 5-hydroxypentanoic acid, and 6-hydroxyhexanoic acid.

Accordingly, the invention provides a method to prepare a polymer comprising carrying out ring-opening polymerization on one or more compounds of formula VII:

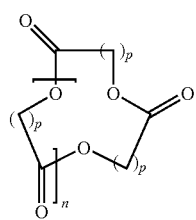

(VII)

wherein n is 0 to about 30, preferably about 1 to about 10; p is 1 to 5; and the polymerization is carried out in the presence of an effective catalyst to provide one or more polymers of formula VIII:

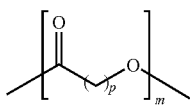

(VIII)

wherein m is about 10 to about 2500, preferably about 20 to about 1000. The terminal groups on the polymers of formula VIII can be the same as the terminal groups of the polymers of formula I.

DETAILED DESCRIPTION

The following definitions are used, unless otherwise described. Specific and preferred values listed below for radicals, substituents, and ranges, are for illustration only; they do not exclude other defined values or other values within defined ranges for the radicals and substituents. Alkyl, alkoxy, alkenyl, etc. denote both straight and branched groups.

The group "alkyl" refers to a linear or branched hydrocarbon radical that is optionally unsaturated and optionally substituted with functional groups as described herein. The alkyl group can contain from 1 to about 30 carbon atoms. For example and without limiting the scope of the invention, alkyl can be methyl, ethyl, propyl, isopropyl, butyl, iso-butyl, sec-butyl, tert-butyl, pentyl, 3-pentyl, hexyl, heptyl, or octyl. In one embodiment, alkyl is preferably $(C_1-C_6)$alkyl. In another embodiment, alkyl is preferably $(C_1-C_4)$alkyl.

In an embodiment of the invention where the alkyl group is unsaturated, the alkyl is an alkenyl group. Alkenyl can be, for example, vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl.

The group "alkoxy" refers to an optionally substituted alkyl group that is substituted with an oxygen radical. Alkoxy can be, for example, methoxy, ethoxy, propoxy, isopropoxy, butoxy, iso-butoxy, sec-butoxy, pentoxy, 2-pentoxy, 3-pentoxy, or hexyloxy.

As referred to herein, "aryl" refers to a monovalent aromatic hydrocarbon radical of 6-20 carbon atoms derived by the removal of one hydrogen atom from a single carbon atom of a parent aromatic ring system. Aryl groups are typically made up of 6-10 carbon atoms and can optionally possess additional substituents as described herein. Typical aryl groups include, but are not limited to, radicals derived from benzene, naphthalene, anthracene, biphenyl, and the like.

As referred to herein, a "hydroxycarboxylic acid" is an alkane carboxylic acid that contains a hydroxyl group substituent on one of the carbon atoms of the chain other than the carboxy carbon atom. Representative hydroxycarboxylic acids include both straight chain and branched hydroxy-substituted carboxylic acids. As described for alkyl groups, the carbon chain of the hydroxycarboxylic acid can be optionally unsaturated, for example with one or more carbon-carbon double bonds or a carbon-carbon triple bond.

The hydroxycarboxylic acid can also be optionally substituted with functional groups as described herein.

"Optionally" substituted refers to a group in which one or more hydrogen atoms are each independently replaced with a non-hydrogen substituent. Typical substituents include, but are not limited to, —X, —R, —O⁻, =O, —OR, —S⁻, —SR, —S(=O)R, —S(=O)₂R, —S(=O)₂O⁻, —S(=O)₂OH, —OS(=O)₂OR, —S(=O)₂NR, —N(R)₂, —N⁺(R)₃, =NR, —N=C=O, —NCS, —NO, —NO₂, =N₂, —N₃, NC(=O) R, —CX₃, —C(O)O⁻, —C(=O)R, —C(O)OR, —C(=O)X, —C(=O)N(R)₂, —C(S)R, —C(S)OR, —C(O)SR, —C(S) SR, —C(S)NRR, —C(NR)N(R)₂, —CN, —OCN, —SCN, —OP(=O)(OR)₂, —P(=O)(OR)₂, —P(=O)(O⁻)₂, —P(=O)(OH)₂, where each X is independently a halogen (F, Cl, Br, or I); and each R is independently —H, alkyl, for example $(C_1-C_6)$alkyl, aryl, for example $(C_6-C_{10})$aryl, a heterocyclic ring (heteroalkyl or heteroaryl), or a protecting group.

The cyclic oligomers, polymers, and derivatives described herein comprising functional groups such as those depicted above can also include optional protecting groups. Suitable removable protecting groups are known to those skilled in the art (see for example, T. W. Greene, *Protecting Groups In Organic Synthesis*; Wiley: New York, Third Edition, 1999, and references cited therein).

As referred to herein, a "macrocycle" is a cyclic molecule with six or more members in the ring. Macrocycles typically will have ten or more atoms in the ring. The ring can comprise carbon atoms or heteroatoms, such as oxygen, nitrogen, phosphorus, or combinations thereof. The macrocycle can be made of two or more monomers that have been condensed to form the macrocycle. These macrocycles are commonly referred to as cyclic oligomers. The cyclic oligomers can have from 2 to about 30 monomeric units per molecule.

As referred to herein, the "polydispersity index" is a ratio of the weight average molecular weight to the number average molecular weight, which is a measure of the breadth of molecular weight distribution within a sample.

Macrocyclic esters have been generated from β-propiolactone. β-Propiolactone, however, is carcinogenic and its large scale synthesis is problematic. It was reasoned that less strained macrocyclic esters could be constructed directly from hydroxy-substituted carboxylic acids. These cyclic oligomers were surprisingly found to be susceptible to ring opening polymerization (ROP). By using a catalyst that is active at low temperature (*J. Am. Chem. Soc.* 2003, 125, 11350), high conversions were attained.

Accordingly, a new methodology for the preparation of high molecular weight poly(ω-hydroxy carboxylic acid) has been developed. The method employs macrocyclic monomers derived directly from ω-hydroxycarboxylic acids. In one embodiment of the invention, P[3-HP] can be prepared by polymerizing a cyclic oligomer. The cyclic oligomer can be prepared by condensing 3-hydroxypropionic acid monomers, as illustrated in Scheme 1.

Scheme 1

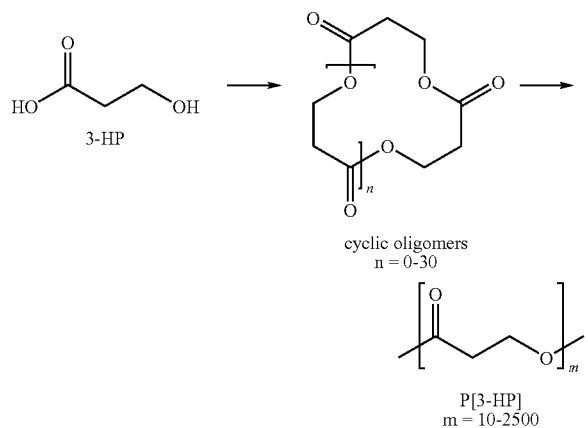

cyclic oligomers
n = 0-30

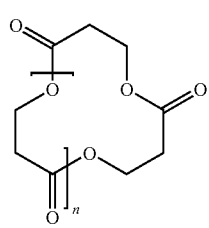

P[3-HP]
m = 10-2500

Cyclic oligomers derived from other monomers can be prepared in a similar manner, for example, the cyclic oligomers of formula VII.

Starting Materials

The starting materials for the methods of the invention can be one or more cyclic oligomers. The one or more cyclic oligomer can be compounds of formula II:

(II)

wherein n is 0 to about 30. Alternatively, the cyclic oligomer can be one or more compounds of formula VII:

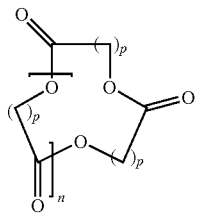

(VII)

wherein n is 0 to about 30, and p is 1 to 5. It is possible in some embodiments for the value of n to be greater than 30. The value of n can also be about 1 to about 10. In other embodiments, the value of n can be about 3 to about 7. The value of p can be any number from 1 though 5, inclusive. The methods of the invention can employ mixtures of different size cyclic oligomers, i.e., wherein individual compounds of formulas II or VII in the mixtures have different values of n.

The cyclic oligomers can be prepared from a variety of hydroxycarboxylic acids. In one embodiment, the cyclic oligomers can be prepared from ω-hydroxycarboxylic acids. In another embodiment, the cyclic oligomers can be prepared from carboxylic acids that contain a hydroxyl group attached to a secondary carbon atom (a methine unit of the carboxylic acid alkyl chain). For example and without limiting the scope of the invention, the polymerization can be carried out on cyclic oligomers derived from the condensation of 2-hydroxyacetic acid, 3-hydroxypropionic acid, 4-hydroxybutanoic acid, 5-hydroxypentanoic acid, 6-hydroxyhexanoic acid, or combinations thereof.

In one embodiment, the cyclic oligomer can be prepared from an aqueous solution of a hydroxycarboxylic acid. The hydroxycarboxylic acid can be, for example, about 10 wt. % to about 30 wt. % of the aqueous solution. In one embodiment, the hydroxycarboxylic acid is about 20 wt. % of the aqueous solution. The cyclic oligomer can be prepared by acid-catalyzed self-condensation of the hydroxycarboxylic acid. The condensation can be carried out in an organic solvent. The organic solvent can be an aromatic solvent. Suitable examples of the organic solvent include benzene, toluene, and combinations thereof. Any suitable and effective acid catalyst can be employed in the condensation reaction. The acid catalyst can be, for example, p-toluenesulfonic acid. More than one ring size of the cyclic oligomer can be formed in the condensation reaction. To facilitate the condensations, water can be removed from the reaction mixture, for example, by azeotropic distillation. The cyclic oligomers of different ring sizes can optionally be isolated prior to polymerization.

Catalysts Employed in the Polymerization

An effective catalyst is used to promote the polymerization cyclic oligomers. The effective catalyst can be an organic catalyst, an inorganic catalyst, or an organometallic catalyst, for example, an organometallic complex. The catalyst can be a transition metal catalyst. The transition metal can be coordinated to organic groups, such as, for example, alkoxy groups, aryloxy groups, alkylamine groups, aralkylamine groups, or combinations thereof. The catalyst can be a zinc alkoxide complex.

Accordingly, the invention provides a method to prepare a polymer by carrying out ring-opening polymerization with an effective amount of a catalyst. The catalyst can be a compound of formula V:

(V)

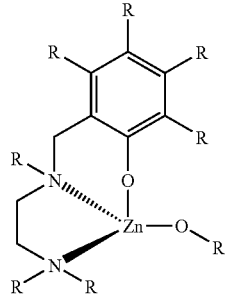

wherein each R is independently hydrogen or alkyl. The structure of the catalyst employed in the reaction can be monomeric, dimeric, or a rapidly equilibrating mixture of monomeric and dimeric species. The invention also provides a method to prepare a polymer by carrying out ring-opening polymerization with an effective amount of a catalyst of formula VI:

(VI)

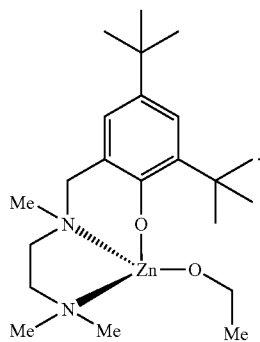

Preparation of the compound of formula VI is described by Williams et al. *J. Am. Chem. Soc.* 2003, 125, 11350, the disclosure of which is incorporated by reference herein. One skilled in the art will understand that other structural variations of the catalysts of formulas V and VI can also be effective to catalyze ring-opening polymerization reactions. For example, the preparation of the compound of formula VI includes treating a precursor with ethanol. By treating the precursor of the compound of formula VI with different alcohols, a variety of alkoxide complexes can thus be prepared. By employing these derivatives in the polymerization reaction of the invention, polymers with various alkoxy terminal groups can be prepared. Additionally, it is possible that heteroatoms besides oxygen can be used to coordinate to the transition metal catalyst at this site.

Polymers Prepared by the Methods of the Invention

The polymers prepared by the methods described herein can be one or more polymers of formula I or VIII:

(I)

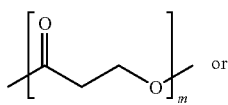

or

-continued (VIII)

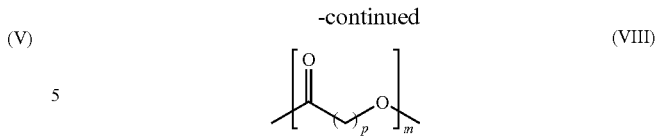

wherein m is about 10 to about 2500, and for formula VIII, p is 1 to about 5. It is possible in some embodiments for the value of m to be less than about 10. Additionally, it is possible for the value of m to be greater than about 2500. In other embodiments, the value of m can be about 20 to about 1000, about 10 to about 100, or 500 to about 1000.

The polymers of formulas I and VIII prepared by the methods described herein can have various terminal groups. The polymers will typically have one terminal group that is derived from the catalyst used to initiate the polymerization. For example, if the catalyst used in the reaction is a transition metal complex with an alkoxy group coordinated to the metal, one terminal group can be an alkoxy group. In one embodiment, one terminal group can be an ethoxy group, for example, the ethoxy group of an ethoxycarbonyl group.

The second terminal group will typically be a monomer of the macrocycle that was polymerized, or a derivative thereof. For example, when an ω-hydroxycarboxylic acid is a monomer of the macrocycle, the second terminal group can be an ω-hydroxy carboxylic ester. In other embodiments, elimination of the hydroxyl group can occur such that the polymer terminates with an ω-alkene carboxylic ester. In one embodiment, the second terminal group can be an acryloyl ester.

In some embodiments, the polymers produced can have alkoxy groups at the terminal position of some polymers and unsaturated hydrocarbon groups at the terminal positions of other polymers. For example, in one embodiment, the polymer can be a polymer of formula III:

(III)

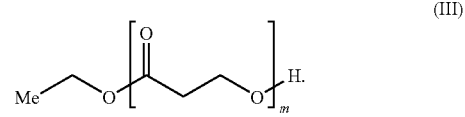

In another embodiment, the polymer can be a polymer of formula IV:

(IV)

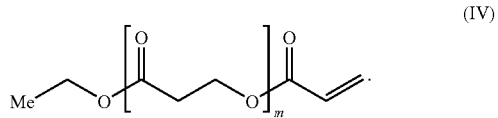

In yet another embodiment, polymers of formulas III and IV (III)

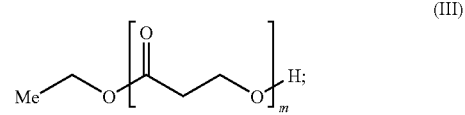

-continued

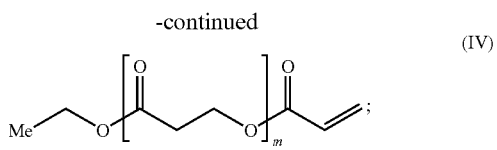

(IV)

are both produced by the polymerization of cyclic oligomers. Different ratios of the polymers of formula III and formula IV can result from the polymerization reaction. In some embodiments, the ratio of the polymer of formula III to the polymer of formula IV can be about 1:10 to about 10:1. In other embodiments, the ratio of the polymer of formula III to the polymer of formula IV can be about 1:2 to about 1:6. In another embodiment, the ratio of the polymer of formula III to the polymer of formula IV is about 1:3.

The polymers prepared by the methods disclosed herein can have a variety of polydispersity indices, depending on the conditions employed in the polymerization. The polymers prepared in a given polymerization can have a polydispersity index (PDI) of about 1 to about 3. In other embodiments, the PDI can about 1.4 to about 2, or about 1.5 to about 1.9.

Reaction Conditions

The methods of the invention can be carried out under a variety of different conditions. The polymerization can be carried out in solution, or alternatively, under melt conditions ("melt polymerization") in the absence of solvent.

A variety of solvents can be used to facilitate the polymerization. The solvent system can be a single solvent, or a combination of solvents. Examples of suitable solvents include chlorinated solvents and aromatic solvents. Specific examples include, but are not limited to, dichloromethane, chlorobenzene, toluene, tetrahydrofuran, and combinations thereof. Other embodiments of the invention can include the use of solvents such as benzene, dioxane and other alkyl ethers such as glycol ethers, for example, dimethoxyethane; and combinations thereof.

The polymerization can be carried out at any suitable and effective temperature. The reaction can be run at room temperature, above room temperature, or even below room temperature. In one embodiment, the reaction is carried out at about 20° C. to about 25° C. In another embodiment, the polymerization is carried out at above about 25° C. In other embodiments, the polymerization can be carried out at about 60° C., about 80° C., about 100° C., about 150° C., about 200° C., or about 250° C.

The polymerization proceeds at various rates under different conditions. Satisfactory conversion of the cyclic oligomer can be achieved in less than about 1 minute. Conversions of greater than 90% can be achieved in as little as about 2 minutes. Depending on reaction conditions, the polymerization can be carried out for a period of about 1 minute to about 10 hours. More typically, the polymerization is carried out for a period of about 2 minutes, about 10 minutes, about 30 minutes, about 60 minutes, about 90 minutes, or about 120 minutes. In certain embodiments, the melt conditions require longer reaction times than solution state reactions to achieve similar conversions of the cyclic oligomers.

The polymerization can be carried out under a broad range of initial concentrations of the cyclic oligomer. The initial concentration of the cyclic oligomer can be about 0.01 M to about 6 M. One skilled in the art will understand that the overall initial concentration of the individual monomers will be proportionally higher than the initial concentration of the cyclic oligomers.

Under melt conditions, the initial concentration of the cyclic oligomer will be dependent upon the density of the neat oligomer. Thus, the initial concentration of the cyclic oligomer can be as high as about 5 M or about 6 M under melt conditions.

The polymerization of the cyclic oligomers can also be carried out under a variety of concentrations in solution. The initial concentrations of the cyclic oligomer will often depend upon the solvent system employed and the solubility of the cyclic oligomer employed. A typical initial concentration of the cyclic oligomer is about 1.5 M. In other embodiments, the initial concentration can be about 0.01 M, about 0.1 M, about 0.2 M, about 0.5 M, about 1 M, about 2 M, or about 3 M.

The polymerization can be carried out under a broad range of initial concentrations with respect to the catalyst. The initial concentrations of the catalyst will often depend upon the solvent system employed (or lack thereof) and the solubility of the catalyst employed. Accordingly, the initial catalyst concentration is often measured with respect to the initial concentration of the oligomer. A variety of initial concentrations of the catalyst can be employed: for example, see Table 2, Examples Section. The initial concentration of the catalyst can be about 1 M to about $10^{-5}$ M. In other embodiments, the initial concentration of the catalyst can be about 0.5 M to about $10^{-3}$ M.

The number average molecular weight of the polymers will depend in some respects to the reaction conditions employed (see Table 2). The polymers prepared by the methods of the invention can have a number average molecular weight ($M_n$) of about 1 kg/mol to about 250 kg/mol, as determined by size exclusion chromatography (SEC). In some embodiments, the polymer can have a number average molecular weight of about 2 kg/mol to about 75 kg/mol.

The polymers prepared can be semicrystalline, as determined by differential scanning calorimetry. For example, in one embodiment the polymer of formula I can have a glass transition temperature of about 20° C. to about 30° C. In other embodiments, the polymer of formula I can have a glass transition temperature of about 21° C. to about 28° C. The polymer of formula I can have a melting temperature of about 60° C. to about 80° C. In other embodiments, the polymer of formula I can have a melting temperature of about 62° C. to about 78° C.

The polymerization can be performed on a variety of scales. The polymerization can be carried out at a millimolar scale or on a molar scale. One skilled in the art will recognize that reactions of about 0.1 mole to about 1.0 moles of cyclic oligomer can be conveniently carried out. The polymerization can also be carried out on more than about 1 kilogram of cyclic oligomer, or on more that about 10 kilograms of cyclic oligomer.

Additional Procedures

Also provided is a method for the isolation of the polymers prepared by the polymerization described herein. The polymer can be isolated by precipitating the polymer from a reaction mixture. The precipitation can involve adding a solvent or solvent system to the reaction mixture. The system can be any suitable and effective solvent that substantially precipitates the polymer from a reaction mixture. Suitable solvents include cyclic ethers and hydrocarbons, for example, a mixture of tetrahydrofuran and alkanes, such as saturated ($C_5$-$C_{10}$) hydrocarbons, e.g., hexanes.

Also provided are methods of modifying the terminal groups of the polymers prepared by the methods of the invention. The ester end groups can be hydrolyzed and the resulting carboxylic acids can be reacted with suitable compounds and reagent to form polymer derivatives. For example, after hydrolysis, the terminal group can be condensed with a hydroxyl group of a fluorescent aryl moiety to synthesize fluoroionophores covalently linked to the polymer. Various salts can also be prepared from the carboxylic acid terminal groups.

Polymers that terminate in an olefinic group can also be modified. The terminal olefin, such as the olefin moiety of an acryloyl group, can be reacted with an oxidizing agent. Additional reactions can link the oxidized group to other organic groups or other polymers. In other embodiments, the olefin moiety can be reacted with a monomer. In yet another embodiment, the olefin moiety can be reacted with a second polymer in the presence of a suitable and effective reagent. In one embodiment, a polymer with a terminal olefin group can be further polymerized to provide one or more graft polymers. The polymerization of the olefin groups can be carried out under free radical conditions.

While the invention is described in conjunction with the enumerated claims, it will be understood that they are not intended to limit the invention to those claims. On the contrary, the invention is intended to cover all alternatives, modifications, and equivalents, which may be included within the scope of the present invention as defined by the claims. The invention will now be illustrated by the following non-limiting Examples.

EXAMPLES

General considerations. All air- or moisture-sensitive compounds were handled under a nitrogen atmosphere in a glovebox. Dichloromethane used for polymerizations was purified by passing through activated alumina-based columns (Glass Contour, Laguna Beach, Calif.) and all other solvents were used as received from a commercial source without further purification. Benzyl alcohol (Aldrich) was dried over $CaH_2$ and vacuum distilled. A 20 wt % aqueous solution of 3-hydroxypropionic acid (Cargill) was used as received. p-Toluene sulfonic acid monohydrate and $Sn(oct)_2$ were used as received from Aldrich without further purification. The zinc catalyst was synthesized as previously reported (Williams, C. K.; Breyfogle, L. E.; Choi, S. K.; Nam, W. W.; Young, V. G.; Hillmyer, M. A.; Tolman, W. B. *J. Am. Chem. Soc.* 2003, 125, 11350).

NMR spectra were collected on a Varian INOVA-300 or Varian INOVA-500 spectrometer. Chemical shifts were reported in units of ppm and referenced to the protio impurities in the deuterated solvents for $^1H$ and corresponding $^{13}C$ resonances. Molecular weights ($M_n$ and $M_w$) and polydispersity indices ($M_w/M_n$) were determined by size exclusion chromatography (SEC) in $CHCl_3$ using polystyrene standards. Samples were analyzed at 30° C. using a Waters high performance liquid chromatograph connected to three Jordi Gel DVB columns with pore sizes of $10^4$, $10^3$ and 500 Å and a Waters 2410 refractive index detector. The solvent was eluted at a flow rate of 1.0 mL/min.

Matrix-assisted laser desorption ionization mass spectrometry (MALDI-MS) was performed on a Bruker Reflex III MALDI-TOF mass spectrometer. Samples were deposited in a dithranol/sodium trifluoroacetate matrix. Internal calibration of the instrument was performed using PEO standards. Differential scanning calorimetry (DSC) was performed on a TA Q 1000 DSC machine. An indium standard was used for calibration, and nitrogen was used as the purge gas. Samples with a weight range of 5.0-10.0 mg were loaded into aluminum pans, the masses were recorded, and the pans were sealed prior to measurement. High-resolution mass spectrometry using electrospray ionization (HRMS-ESI) was performed on a Bruker Bio-TOF II ESI-TOF mass spectrometer. Thin layer chromatography (TLC) was performed on prepared silica gel TLC plates (0.2 mm silica gel 50 F-254, plastic plates). Column chromatography was performed using silica gel 60 (70-230 mesh) with the optimal solvent system determined by TLC.

Polymerizations. The glassware used was oven dried, treated with a solution of $Me_2SiCl_2$ (1.0 M in $CH_2Cl_2$), and oven dried at 200° C. for a minimum of 3 hours before use. The stock solutions of zinc-alkoxide catalyst, $Sn(oct)_2$ and benzyl alcohol were prepared separately such that $[Zn]_0=0.050$ M, $[Sn(oct)_2]_0=0.310$ M and $[benzyl\ alcohol]_0=0.194$ M in $CH_2Cl_2$ and were stored under nitrogen at −30° C. The amount of catalyst used varied depending on the desired molecular weight of the resulting polymer.

Example 1

Synthesis of 3-HP Cyclic Esters

Commercially available aqueous solutions of 3-HP (20 wt %) were converted via acid-catalyzed (1-10 mol %) self-condensation with concomitant removal of water to a mixture of macrocycles and linear oligomers (Scheme 2). After limited optimization (Table 1), the macrocycles were isolated in good yield (60%) using a straightforward protocol.

Scheme 2

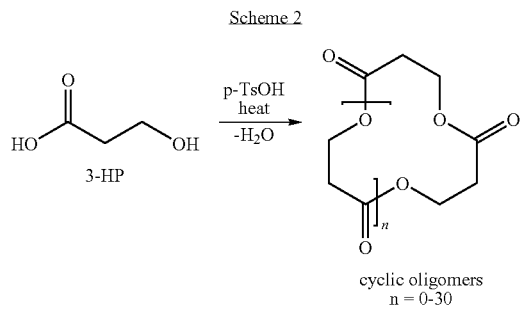

cyclic oligomers
n = 0-30

TABLE 1

Dependence of 3-HP cyclic esters' yield on reaction conditions

| solvent | $[3-HP]_0$ (M) | yield of 3-HP cyclic esters (%) |
|---|---|---|
| benzene | 0.11-0.15 | 20-29 |
| benzene | 0.03 | 45 |
| toluene | 0.03 | 60 |
| toluene | 0.14 | 25 |

A round bottomed flask equipped with a Dean-Stark apparatus was charged with 3-hydroxypropionic acid (20 wt %) aqueous solution (80 g, 0.178 mol), p-toluene sulfonic acid monohydrate (2.5 g, 0.0131 mol) and toluene (1.3 L). The reaction mixture was refluxed for 2 days and ~67 mL of water was removed azeotropically. The solution was allowed to cool to room temperature and filtered. The filtrate was concentrated to about 200-300 mL under reduced pressure. The concentrated toluene solution was then washed sequentially with saturated $NaHCO_3$ aqueous solution, distilled water until pH=7, and washed with saturated aqueous NaCl solution. The toluene phase was separated and dried over anhydrous $MgSO_4$. Filtration and evaporation of toluene afforded a sticky white solid (3.8 g, 30%). Subsequent column chromatography ($R_f$=0.4, benzene:ethyl acetate=1:1) afforded the 3HP trimer, which was further purified by recrystallization in CH$_2$Cl$_2$/hexane solution to give a white crystalline solid (1 g, 8%) and identified by comparison of its NMR spectra with data reported in the literature (Shanzer et al. *J. Am. Chem. Soc* 1981, 103, 7339; Roelens, S. *J. Chem. Soc., Chem. Comm.* 1990, 58).

The oligomeric fraction can be recycled and a continuous process for the isolation of the macrocycles can be employed. The identity of the macrocycles was confirmed by NMR spectroscopy by comparison with literature data (see Williams, cited above). Additional mass spectrometric characterization indicated that the macrocyclic mixture contained predominantly trimer (three 3-hydroxypropionic acid monomer units), tetramer, and pentamer, but cyclics with up about 25 3-HP subunits were observed. By $^{13}$C{$^1$H} NMR spectroscopy, the following weight percentages in the mixture were found: trimer 31%, tetramer 17%, pentamer 17%, hexamer 12%, heptamer 8%. For initial polymerization studies, the trimer was isolated and purified by column chromatography and recrystallization.

Examples 2 and 3

Use of the catalyst Sn(octanoate)$_2$ in the presence of benzyl alcohol for the polymerization of a 3-HP trimer was not successful; no polymerization occurred in either solution state at room temperature (RT) or in the melt (70° C.) after 48 hours at high catalyst loadings.

Example 2

Failed Synthesis of P[3-HP] with a Tin Catalyst in Solution

A representative procedure for the failed polymerization of a 3-HP trimer by Sn(oct)$_2$ and benzyl alcohol in solution state is as follows. In the glovebox, a vial was charged with 3-HP trimer (50 mg, 0.231 mmol) and CH$_2$Cl$_2$ (169 μL). A volume of the Sn(oct)$_2$ stock solution (7.5 μL, 2.31 μmol) and a volume of benzyl alcohol stock solution (23.8 μL, 4.62 μmol) were injected into the monomer solution with stirring. The reaction mixture was stirred at room temperature for 48 hours. The reaction was quenched by exposure to the air outside the glovebox. The CH$_2$Cl$_2$ was removed in vacuo and the NMR spectra of the reaction mixture suggested that no reaction occurred.

Example 3

Failed Synthesis of P[3-HP] with a Tin Catalyst under Melt Conditions

A representative procedure for the failed polymerization of the 3-HP trimer by Sn(oct)$_2$ and benzyl alcohol in the melt is as follows. In the glovebox, a vial was charged with 3-HP trimer (30 mg, 0.139 mmol). A volume of the Sn(oct)$_2$ stock solution (4.5 μL, 1.39 μmol) and a volume of benzyl alcohol stock solution (7.2 μL, 1.39 μmol) were injected onto the monomer. The residual CH$_2$Cl$_2$ was removed in vacuo and the vial was sealed. The vial was then submerged in an oil bath pre-set at 70° C. The reaction mixture was stirred at 70° C. for 48 hours. The reaction was then quenched by exposure to the air. The NMR spectra of the reaction mixture suggested that no reaction occurred.

Examples 4 and 5

With a more active Zn-alkoxide reagent, ROP of the 3-HP trimer proceeded rapidly at about 23° C. in CH$_2$Cl$_2$ (Scheme 3). In less than 30 minutes, 90% of the trimer was converted into P[3-HP] ([trimer]$_0$=1.2 M, [trimer]$_0$:[Zn]$_0$=50:1), which was isolated by precipitation from THF/hexane (1:1). The product was characterized by SEC (Table 2) and NMR ($^1$H and $^{13}$C{$^1$H}) spectroscopy. Further analysis of a similarly prepared low molecular weight P[3-HP] sample ($M_n$=2.4 kg·mol$^{-1}$, PDI=1.7) by matrix assisted laser desorption/ionization (MALDI) MS revealed three envelopes of peaks. Of these, two were assigned to P[3-HP], with the third indicative of cyclic oligomers.

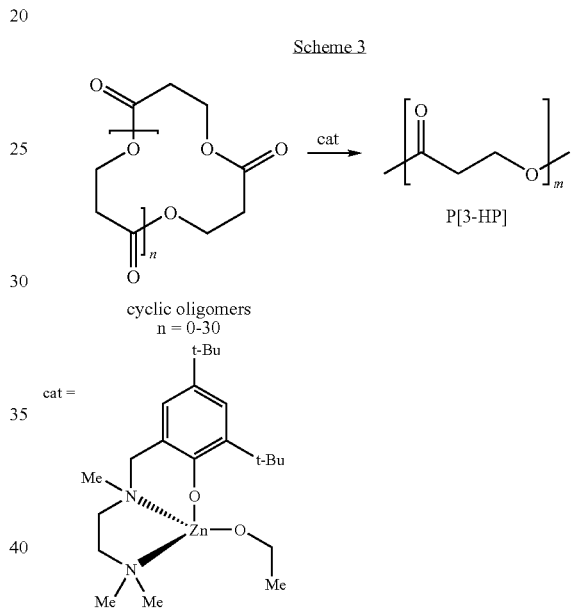

Scheme 3

The P[3-HP] fractions contain ethoxy ester and hydroxyl end groups, or ethoxy ester and acrylate end groups. These assignments were confirmed by $^1$H NMR spectroscopy, which indicated a ratio of 1:3 for the two types of polymers. The formation of ethoxy ester end groups confirms that the ROP occurs through the cleavage of the acyl-C—O bond and insertion of an ethoxy group from the catalyst. By monitoring the reaction in situ, it was established that the acrylate end group was formed during the course of the reaction, mechanistic details of which are under investigation.

TABLE 2

Data for ROP reactions of trimer in solution state and in melt.[a]

| [M]$_0$/[Zn]$_0$ | Conv. (%) | $M_n$(theor) | $M_n$(SEC) | PDI |
|---|---|---|---|---|
| 10 [b] | 94 | 2.0 | 2.4 | 1.7 |
| 50 [b] | 94 | 10.2 | 11.6 | 1.5 |
| 100 [b] | 95 | 20.5 | 19.5 | 1.6 |
| 200 [b] | 95 | 41.0 | 32.0 | 1.6 |
| 400 [b] | 88 | 76.4 | 53.0 | 1.6 |
| 800 [b] | 91 | 157.2 | 66.5 | 1.5 |
| 50 [c] | ~100 | 10.8 | 12.3 | 1.5 |
| 100 [c] | 93 | 20.1 | 15.3 | 1.6 |

TABLE 2-continued

Data for ROP reactions of trimer in solution state and in melt.[a]

| $[M]_0/[Zn]_0$ | Conv. (%) | $M_n$(theor) | $M_n$(SEC) | PDI |
|---|---|---|---|---|
| 200[c] | 88 | 38.1 | 27.6 | 1.9 |
| 400[c] | 78 | 67.6 | 43.6 | 1.8 |
| 800[c] | 40 | 69.9 | 52.7 | 1.7 |

[a] $M_n$ values are in units of kg·mol$^{-1}$; $[M]_0$ = initial concentration of the trimer of 3-HP; $[Zn]_0$ = initial concentration of the catalyst (Scheme 1); $M_n$(theor) is based on the conversion from $^1H\{^1H\}$ NMR spectra.
[b] Reactions quenched at different times between 2 to 60 minutes. Conditions: RT, $CH_2Cl_2$, $[M]_0$ = 1.54 M.
[c] Reactions were quenched after 80 minutes. Conditions: 80° C., no solvent.

To assess the control of polymer molecular weight, reaction aliquots were analyzed by $^1H\{^1H\}$ NMR spectroscopy and size exclusion chromatography (SEC). At early reaction times, the $M_n$ increased linearly with conversion, followed by a modest decrease in molecular weight at high conversions. This behavior is consistent with intramolecular transesterification and concomitant extrusion of cyclic oligomers. The proposed formation of cyclic oligomers was supported by the $^1H$ and $^{13}C\{^1H\}$ NMR spectra and MALDI-MS data. By controlling the reaction time and catalyst loading, P[3-HP] was obtained with molecular weights ($M_n$) between 2.4 and 67 kg·mol$^{-1}$ (Table 2). The $M_n$ values determined by SEC using polystyrene standards were in reasonable agreement with the $M_n$ values calculated considering the initial monomer to catalyst ratios and trimer conversion for the first five entries in Table 2.

All P[3-HP] samples generated by polymerization of the trimer were semi-crystalline by differential scanning calorimetry (DSC, 18-47% depending on $M_n$). Both glass transition temperatures ($T_g$) and melting temperatures ($T_m$) generally increased with increasing $M_n$ between 2.4 and 30.7 kg·mol$^{-1}$ and remained constant at higher molecular weight. The $T_g$ ($\approx$−22° C.) and $T_m$ ($\approx$76° C.) of the high molecular weight P[3-HP] generated from the polymerization of the trimer agreed with those reported in the literature ($T_g$=−21° C., $T_m$=79° C.; $T_g$=−23° C., $T_m$=73° C.). See He et al. *Polym. Int* 2000, 49, 609; and Cao at al. *Polym. J.* 1998, 30, 743.

The successful controlled ROP of the trimer in $CH_2Cl_2$ solution at RT demonstrated that 3-HP can be converted to P[3-HP] via the macrocyclic approach. Variations were then assessed with the aim of further enhancing practical utility. For example, melt polymerizations are desirable since they avoid the use of solvent. Given the low melting point of the trimer (56° C.) and the high temperature stability of the Zn catalyst (Schreck, K. M.; Hillmyer, M. A. *Tetrahedron* 2004, 60, 7177), polymerization of the neat trimer was explored at 80° C. (Table 2). While the molecular weight control was not quite at the level demonstrated for the solution polymerizations, high molecular weight P[3-HP] was generated using as little a 0.13 mol % catalyst in 80 minutes.

Example 4

Zinc-Catalyzed Solution State Polymerization Procedure

A representative zinc-catalyzed solution state polymerization procedure is as follows. In the glovebox, a vial was charged with 3-HP trimer (50 mg, 0.231 mmol) and $CH_2Cl_2$ (104 μL). A volume of the catalyst stock solution (46.2 μL, 2.31 μmol) was injected into the monomer solution with stirring. The reaction mixture was stirred at room temperature for 4 minutes. The reaction was then quenched by exposure to the air outside the glovebox. The forming polymer was precipitated by addition of an excess 1:1 THF/hexane. The polymer (34.5 mg, 73%) was separated by decanting, washed with THF a few times and dried in vacuo at room temperature.

Example 5

Zinc-Catalyzed Melt Polymerization Procedure

A representative zinc-catalyzed melt polymerization procedure is as follows. In the glovebox, a vial was charged with 3-HP trimer (50 mg, 0.231 mmol). A volume of the catalyst stock solution (46.2 μL, 2.31 μmol) was injected onto the monomer. The residual $CH_2Cl_2$ was removed in vacuo inside the glovebox and the vial was sealed. The reaction mixture in the vial was then submerged in an oil bath pre-set at 80° C. and was stirred at 80° C. for ~80 minutes. The reaction was then quenched by exposure to the air outside the glovebox. The forming polymer (P[3-HP]) was precipitated by addition of an excess 1:1 THF/hexane. The polymer (44.5 mg, 96%) was separated by decanting, washed with THF a few times and dried in vacuo at room temperature.

Example 6

Zinc-Catalyzed Polymerization of Large Ring Macrocycles

Larger ring macrocycles present in the macrocyclic fraction obtained from the self-condensation of aqueous 3-HP were readily polymerized. A fraction containing only tetramer and pentamer (85:15) was isolated and it was found that the fraction was rapidly converted (83%) into high molecular weight P[3-HP] ($M_n$=74.3 kg·mol$^{-1}$, PDI=1.6) in $CH_2Cl_2$ at RT in 60 minutes ([tetramer+pentamer]$_0$=1.1 M, [tetramer+pentamer]$_0$:[Zn]$_0$=572:1). These results illustrate that the ability to polymerize the macrocycles derived from 3-HP is not limited by ring strain, and that macrocyclic ester mixtures can be employed in large scale polymerizations.

Example 7

Differential Scanning Calorimetry (DSC) Characterization Experiments

A small amount of the polymer was loaded onto an aluminum pan. In the DSC experiment, the sample was heated rapidly from 40° C. to 120° C. at a rate of 40° C. min$^{-1}$, whereupon the temperature was held for 3 minutes to remove all thermal history. The sample was then cooled to −100° C. at a rate of 40° C. min$^{-1}$, where the temperature was held for another 3 minutes before heating to 120° C. at a rate of 10° C. min$^{-1}$. The glass transition temperature ($T_g$) was determined from the second heating scan by a mathematical averaging method. Straight lines were fit tangent to the heat flow curve before and after the transition. From the average of the slopes and intercepts of these two lines, a third line was obtained, and the $T_g$ was taken as the temperature at which the heat flow curve intersected this third line and $C_p$ was taken as the slope of the flow curve where it intersected this third line. The melting temperature ($T_m$) and crystallization temperature ($T_c$) were also determined from second heating scan and were taken as the temperatures corresponding to the melting peak maximum or crystallization peak minimum. $\Delta H_m$ and $\Delta H_m$ were taken as the corresponding integrated peak areas. Typical results are illustrated in Table 3.

TABLE 3

| | | | | | | | | |
|---|---|---|---|---|---|---|---|---|
| DSC data for P[3-HP] polymers with $M_n$ between 2.4 to 67 kg·mol$^{-1}$ | | | | | | | | |
| $[M]_0$:$[Zn]_0$ | $M_n$ (kg·mol$^{-1}$) | $T_g$ (°C.) | $T_m$ (°C.) | $T_c$ (°C.) | $\Delta H_m$ (J·g$^{-1}$) | $\Delta H_c$ (J·g$^{-1}$) | $C_p$ (J·g$^{-1}$·°C.$^{-1}$) | crystallinity (%)[a] |
| 10 | 2.4 | −27.6 | 61.6 | 19.0 | 66.43 | 45.20 | 0.6834 | 17.9 |
| 50 | 11.6 | −24.8 | 71.4 | 6.4 | 70.02 | 28.24 | 0.5336 | 35.1 |
| 100 | 19.5 | −25.2 | 73.5 | 7.4 | 73.05 | 20.98 | 0.4058 | 43.8 |
| 200 | 32.0 | −22.3 | 76.5 | 13.6 | 65.14 | 32.79 | 0.5387 | 27.2 |
| 400 | 53.0 | −21.6 | 76.6 | 10.5 | 62.42 | 6.40 | 0.1914 | 47.1 |
| 800 | 66.5 | −21.4 | 74.6 | 8.4 | 62.65 | 12.94 | 0.3211 | 41.8 |

[a]Crystallinity was calculated using 118.9 J·g$^{-1}$ as the heat of fusion from 100% crystalline P[3-HP]

In conclusion, a new synthetic route for preparing poly(ω-hydroxy carboxylic acid) through ROPs of macrocyclic esters prepared directly from aqueous solutions of ω-hydroxy carboxylic acids has been discovered. Aqueous solutions of 3-HP are available commercially, and this inexpensive and renewable starting material provides an excellent precursor for the synthesis of P[3-HP]. Good control over the molecular weights of the P[3-HP] polymers was observed. High molecular weight samples were accessed, both from pure trimer as well as from a mixture of larger cyclics (tetramers+pentamers). Moreover, the ROP of the trimer was successfully conducted without solvent at 80° C. End-group analysis indicated the partial formation of acrylate groups during the ROP in solution, which enables further elaboration of P[3-HP] into more complex macromolecular architectures (e.g., graft polymers).

All publications, patents, and patent documents cited herein are incorporated by reference, as though individually incorporated by reference. The invention has been described with reference to various specific and preferred embodiments and techniques. However, it should be understood that many variations and modifications may be made while remaining within the spirit and scope of the invention.

What is claimed is:

1. A method to prepare a polymer comprising carrying out ring-opening polymerization of one or more compounds of formula II:

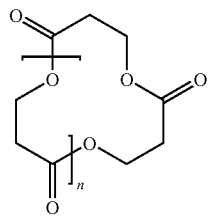

(II)

wherein n is 0 to about 30, in the presence of an effective catalyst, to provide one or more polymers of formula I:

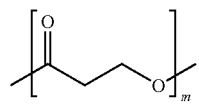

(I)

wherein m is about 10 to about 2500.

2. The method of claim 1 wherein n is 1 to about 10.

3. The method of claim 1 wherein m is about 20 to about 1000.

4. The method of claim 1 wherein one terminal group of the polymer comprises an alkoxy group.

5. The method of claim 4 wherein the second terminal group of the polymer comprises a hydroxyl group or an acryloyl group.

6. The method of claim 1 wherein the polymer of formula I comprises a polymer of formula III or IV:

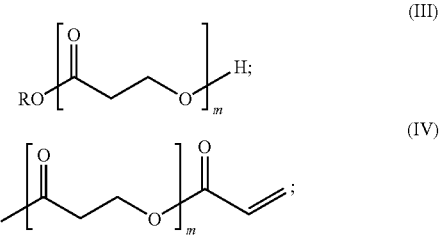

wherein each R is independently hydrogen or alkyl.

7. The method of claim 1 wherein polymers of formulas III and IV:

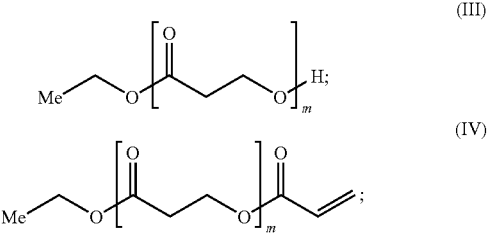

are both produced.

8. The method of claim 7 wherein the ratio of the polymer of formula III to the polymer of formula IV is about 1:10 to about 10:1.

9. The method of claim 1 wherein the catalyst comprises an organometallic complex.

10. The method of claim 1 wherein the catalyst comprises a coordination complex of a transition metal and at least one organic group.

11. The method of claim 1 wherein the catalyst comprises a zinc alkoxide complex.

12. The method of claim 1 wherein the catalyst comprises a compound of formula V:

wherein each R is independently hydrogen or alkyl.

13. The method of claim 1 wherein catalyst comprises a compound of formula VI:

(VI)

14. The method of claim 1 wherein the polymer has a polydispersity index of about it 1 about 3.

15. The method of claim 1 wherein the polymerization is carried out in the presence of a solvent.

16. The method of claim 15 wherein the solvent is a chlorinated solvent.

17. The method of claim 1 wherein the polymerization is carried out in the absence of a solvent.

18. The method of claim 1 wherein the polymerization is carried out at about 20° C. to about 30° C.

19. The method of claim 1 wherein the polymerization is carried out at about 25° C. to about 200° C.

20. The method of claim 1 wherein the initial concentration of the compound of formula (II) is about 0.1 M to about 6.0 M.

21. The method of claim 1 wherein the initial concentration of the catalyst is about 1 M to about $10^{-5}$ M.

22. The method of claim 1 wherein the compound of formula II is prepared from an aqueous solution of 3-hydroxypropionic acid.

23. The method of claim 22 wherein the 3-hydroxypropionic acid is about 10 wt. % to about 30 wt. % of the aqueous solution.

24. The method of claim 22 wherein the compound of formula II is prepared by acid-catalyzed self-condensation of the 3-hydroxypropionic acid.

25. The method of claim 24 wherein the condensation is carried out in a solvent system that comprises an aromatic solvent.

26. The method of claim 24 wherein the acid comprises a sulfonic acid.

27. The method of claim 24 wherein more than one ring size of the compound of formula II is formed.

28. The method of claim 24 wherein water is removed from the reaction mixture of the condensation reaction.

29. The method of claim 24 wherein one or more compounds of formula II are isolated prior to polymerization.

30. The method of claim 1, further comprising isolating the polymer of formula I.

31. The method of claim 30 wherein the isolation comprises precipitating the polymer from a reaction mixture.

32. The method of claim 31 wherein the precipitation comprises adding a solvent system to the reaction mixture.

33. The method of claim 32 wherein the solvent system comprises a cyclic ether and a saturated $(C_5-C_{10})$hydrocarbon.

34. The method of claim 1 wherein the polymer has a number average molecular weight of about 1 kg/mol to about 200 kg/mol.

35. The method of claim 1 wherein the polymer is semicrystalline as determined by differential scanning calorimetry.

36. The method of claim 1 wherein the polymer has a glass transition temperature of about 20° C. to about 30° C.

37. The method of claim 1 wherein the polymer has a melting temperature of about 60° C. to about 80° C.

38. The method of claim 6, further comprising reacting the olefin moiety of the terminal acrylate group of the polymer of formula IV with an oxidizing agent.

39. The method of claim 6, further comprising reacting the olefin moiety of the terminal acrylate group of the polymer of formula IV with a second polymer.

40. The method of claim 6, further comprising reacting the olefin moiety of the terminal acrylate group with a monomer.

41. The method of claim 6, further comprising polymerizing the polymer of formula IV to provide one or more graft polymers.

42. The method of claim 41 wherein the polymerization of the polymer of formula IV is carried out under free radical conditions.

43. A method to prepare a polymer comprising condensing 3-hydroxypropionic acid in the presence of an acid catalyst to provide one or more compounds of formula II:

(II)

wherein n is 0 to about 30; and
carrying out ring-opening polymerization of the one or more compounds of formula II in the presence of an effective catalyst, to provide one or more polymers of formula I:

(I)

wherein m is about 10 to about 2500.

44. The method of claim 43 wherein the catalyst comprises a compound of formula V:

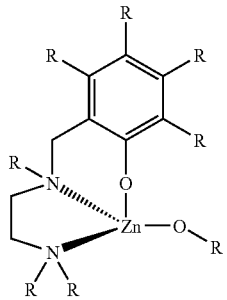
(V)

wherein each R is independently hydrogen or alkyl.

45. A method to prepare a polymer comprising carrying out ring-opening polymerization of one or more compounds of formula VII:

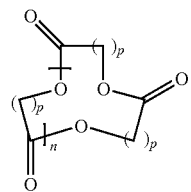
(VII)

wherein
  n is 0 to about 30;
  p is 1 to 5; and
  the polymerization is carried out in the presence of an effective catalyst to provide one or more polymers of formula VIII:

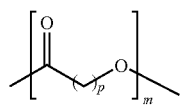
(VIII)

wherein m is about 10 to about 2500.

46. The method of claim 45 wherein the polymer comprises 2-hydroxyacetic acid units, 3-hydroxypropionic acid units, 4-hydroxybutanoic acid units, 5-hydroxypentanoic acid units, 6-hydroxyhexanoic acid units, or a combination thereof.

47. The method of claim 45 wherein the catalyst comprises a compound of formula V:

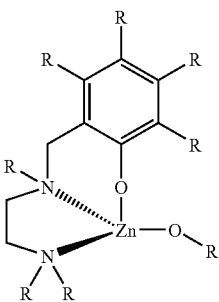
(V)

wherein each R is independently hydrogen or alkyl.

* * * * *

UNITED STATES PATENT AND TRADEMARK OFFICE
CERTIFICATE OF CORRECTION

PATENT NO. : 7,714,097 B2  Page 1 of 1
APPLICATION NO. : 11/545092
DATED : May 11, 2010
INVENTOR(S) : Donghui Zhang et al.

It is certified that error appears in the above-identified patent and that said Letters Patent is hereby corrected as shown below:

On the title page, in item (56), under "Other Publications", in column 2, line 25, delete "Oxoaminium" and insert -- Oxoammonium --, therefor.

On the title page, in item (56), under "Other Publications", in column 2, line 30, delete "Organometallac" and insert -- Organometallic --, therefor.

In column 1, line 55, delete "Marcrocycles" and insert -- Macrocycles --, therefor.

In column 4, lines 41-42, delete "The hydroxycarboxylic acid can also be optionally substituted with functional groups as described herein." and insert the same on Col. 4, Line 40, after "bond." as a continuation of paragraph.

In column 8, line 59, after "IV" insert -- : --.

In column 13, line 2, delete "3HP" and insert -- 3-HP --, therefor.

In column 15, line 42, delete "at" and insert -- et --, therefor.

In column 19, line 38, in Claim 14, delete "about it 1 about 3." and insert -- about 1 to about 3. --, therefor.

Signed and Sealed this

Thirty-first Day of August, 2010

David J. Kappos
*Director of the United States Patent and Trademark Office*